United States Patent
Carniel et al.

(10) Patent No.: US 7,006,744 B2
(45) Date of Patent: Feb. 28, 2006

(54) HYBRID BURIED/RIDGE PLANAR WAVEGUIDES

(75) Inventors: Federico Carniel, Milan (IT); Raffaella Costa, Milan (IT); Andrea Melloni, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/415,128

(22) PCT Filed: Oct. 26, 2001

(86) PCT No.: PCT/IB01/02725

§ 371 (c)(1),
(2), (4) Date: Dec. 4, 2003

(87) PCT Pub. No.: WO02/35267

PCT Pub. Date: May 2, 2002

(65) Prior Publication Data

US 2004/0076394 A1    Apr. 22, 2004

Related U.S. Application Data

(60) Provisional application No. 60/244,926, filed on Nov. 2, 2000.

(30) Foreign Application Priority Data

Oct. 27, 2000 (EP) ................................ 003095080

(51) Int. Cl.
*G02B 6/10* (2006.01)
(52) U.S. Cl. ......................... 385/129; 385/43
(58) Field of Classification Search ........ 385/129–132, 385/43
See application file for complete search history.

(56) References Cited

U.S. PATENT DOCUMENTS 4,999,686 A    3/1991   Autier et al.

(Continued)

FOREIGN PATENT DOCUMENTS

JP    7-142699    *    6/1995

(Continued)

OTHER PUBLICATIONS

R. Germann et al., "Silicon-Oxynitride Layers for Optical Waveguide Applications", Electrochemical Society Proceedings, vol. 99-6, pp. 169-181, (May 1999).

(Continued)

*Primary Examiner*—Ellen E. Kim
(74) *Attorney, Agent, or Firm*—Finnegan, Henderson, Farabow, Garrett & Dunner, L.L.P.

(57) ABSTRACT

A hybrid waveguide structure having a combination of buried waveguide sections and ridge waveguide sections on the same substrate, share a common core layer. The buried waveguide sections provide the low index contrast desirable for couplers and other device components. The ridge waveguide sections provide the high index contrast needed for efficient low-loss tightly curved waveguides. The devices are fabricated starting from a low index contrast buried waveguide. Cladding material is then selectively removed by etching down from an upper surface either side of the waveguide core to a lower surface. This forms an enhanced index contrast ridge section of the waveguide. The other sections of the waveguide core remain buried and thus retain lower index contrast. Using this approach, a variety of optical devices, such as add/drop or add-after-drop multiplexers for WDM applications based on microrings or Mach-Zehnder interferometers, can be made with large feature sizes of several microns using silica-on-glass or silica-on-silicon technology, for example, and without having to use nanofabricated semiconductor structures.

19 Claims, 8 Drawing Sheets

U.S. PATENT DOCUMENTS

| | | | |
|---|---|---|---|
| 5,117,469 A | * | 5/1992 | Cheung et al. ............... 385/11 |
| 5,517,517 A | * | 5/1996 | Liou ....................... 372/50.23 |
| 5,659,646 A | | 8/1997 | Vinchant et al. |
| 5,706,374 A | | 1/1998 | Vinchant |
| 6,621,972 B1 | | 9/2003 | Kimerling et al. |
| 2004/0145025 A1 | * | 7/2004 | Yasuoka et al. ............ 257/432 |
| 2004/0218849 A1 | * | 11/2004 | Blauvelt et al. .............. 385/14 |

FOREIGN PATENT DOCUMENTS

| | | |
|---|---|---|
| WO | WO02/33457 | 4/2002 |

OTHER PUBLICATIONS

Takashi, "Recent Progress on Silica-Based Thermooptic Switches for $ADM_s/XC_s$," Proc. LEOS, pp. 485-486, (1999).

C.K. Madsen et al., "Optical Filter Design and Analysis: A Signal Processing Approach", John Wiley & Sons, p. 241, (1999).

D. Bosc et al., "Hybrid Silica-Polymer Structure for Integrated Optical Waveguides With Potentialities", Materials Science and Engineering No. B57, pp. 155-160, (1999).

V. Tietgen, "Problems of Integrated Optics Topography", Frequenz, No. 35, pp. 247-252, (1981).

G. Zhang et al., "Glass Integrated Optics Circuit for 1.48/1.55- and 1.30/1.55-$\mu$M-Wavelength Division Multiplexing and 1/8 Splitting", Applied Optics, vol. 33, No. 16, pp. 3371-3374, (1994).

D. Rafizadeh et al., "Waveguide-Coupled AlGaAs/GaAs Microcavity Ring and Disk Resonators With High Finesse and 21.6-nm Free Spectral Range", Optics Letters, vol. 22, No. 16, pp. 1244-1246, (Aug. 1997).

B.E. Little et al., "Vertically Coupled Glass Microring Resonator Channel Dropping Filters", IEEE Photonics Technology Letters, vol. 11, No. 2, pp. 215-217, (Feb. 1999).

A.W. Snyder et al., "Optical Waveguide Theory", Chapman & Hall Medical, London, pp. 706-708, (1983).

R. Adar et al., "Measurement of Very Low-Loss Silica on Silicon Waveguides With a Ring Resonator", Applied Physics Letters, vol. 58, No. 5, pp. 444-445, (1991).

B.J. Offrein et al., "Tunable Optical Add/Drop Components in Silicon-Oxynitride Waveguide Structures", ECOC, pp. 325-326, (Sep. 1998).

S. Suzuki et al., "Integrated-Optic Ring Resonators With Two Stacked Layers of Silica Waveguide on Si", IEEE Photonics Technology Letters, vol. 4, No. 11, pp. 1256-1258, (Nov. 1992).

B.J. Offrein et al., "Wavelength Tunable Optical Add-After-Drop Filter With Flat Passband for WDM Networks", IEEE Photonics Technology Letters, vol. 11, No. 2, pp. 239-241, (Feb. 1999).

M. Spuhler et al., "A Very Short Planar Silica Spot-Size Converter Using a Nonperiodic Segmented Waveguide", Journal of Lightwave Technology, vol. 16, No. 9, (Sep. 1998).

Y. Maki, "Three-Dimensional Optical Waveguide Device Having Branching and Coupling Part", Patent Abstracts of Japan of JP 61246704, Nov. 4, 1986.

H. Kiichi, "Production of Semiconductor Optical Waveguide", Patent Abstracts of Japan of JP 03200904, Sep. 2, 1991.

M. Junichiro, "Optical Ring Filter", Patent Abstracts of Japan of JP 62100706, May 11, 1987.

U.S. Appl. No. 60/240,282, filed Oct. 13, 2000, Kimerling et al.

* cited by examiner x-x

HYBRID BURIED/RIDGE PLANAR WAVEGUIDES

CROSS REFERENCE TO RELATED APPLICATIONS

This application is a national phase application based on PCT/IB01/02725, filed Oct. 26, 2001, the content of which is incorporated herein by reference, and claims the priority of European Patent Application no. 00309508.0, filed Oct. 27, 2000, the content of which is incorporated herein by reference and claims the benefit of U.S. Provisional Application No. 60/244,926, filed Nov. 2, 2000, the content of which is incorporated herein by reference.

BACKGROUND OF THE INVENTION

The invention relates to optical waveguide devices and to methods of fabricating optical waveguide devices.

In the realisation of passive integrated optical devices there is often a preferred waveguide structure for each of the building blocks of the device. For example, it is easier to fabricate a high quality directional coupler in a low refractive index contrast waveguide. Refractive index contrast, or index contrast for short, refers to the size of the refractive index difference between the core material and cladding material of the waveguide. A low index contrast is also preferable for fabricating many other optical component building blocks. By contrast, a bent or curved waveguide will tend to require a high refractive index contrast waveguide. Generally, the smaller the bend radius, the larger the refractive index contrast that will be required to keep bend losses to an acceptable level.

Some optical devices include a mixture of components, some of which that are best made with low index contrast waveguides and others of which that are best made with high index contrast waveguides. If such a device is to be made integrated on a single chip or substrate, there is then the problem of how to satisfy the conflicting requirements of the different components of the device.

One example of a device with such conflicting requirements is a ring resonator. Ring resonators are described in references [1],[2],[3] and [4]. These known ring resonators comprise a ring waveguide in combination with one or two straight waveguides that are arranged tangentially to the ring waveguide in order to couple to a circumferential portion of the ring waveguide. In this case, the coupling region is increasingly difficult to fabricate as the index contrast increases, whereas without sufficient index contrast bending losses in the ring will be too high.

Prior art micro-ring resonator designs are now reviewed in more detail. Large radius ring resonators, with radius values of the order of millimetres, have been realisable for some time. Large radius ring resonators are useful for the characterisation of the propagation losses of low index contrast waveguides and for the extraction of a specific emission line from a laser. These devices have been realised in planar lightwave circuit (PLC) technology, with low propagation loss and good fibre coupling. However, because of the low refractive index contrast of such devices, the minimum bend radius achievable is quite large, being several millimetres, and the free spectral range (FSR) is consequently quite small, for example only a few GHz using conventional glass on silicon technology with an index contrast of 0.7% (e.g. 8–12.5 GHz in reference [10]).

To be able to use a ring resonator device as a filter in a wavelength division multiplexed (WDM) system for signal processing, a much larger FSR would be needed, which in turn would require a much smaller bend radius of the ring resonator. A bend radius of a few hundreds of micrometers or less is necessary.

Small radius micro-cavity ring and disk resonators with a radius of 5 micrometers have been demonstrated with deep etched GaAs/AlGaAs waveguides [2]. However, such waveguides are less than half a micrometer wide and present very high propagation and fibre-coupling losses. They also require an excellent nanofabrication process, based on electron-beam lithography and inductive-coupled plasma ion etching in order to achieve the necessary very-deep, ultra-smooth and vertical sidewalls with gaps as small as 150 nm and as deep as 2.5 $\mu$m. The realisation of a good quality directional coupler is a critical issue in high index contrast waveguides, such as these deep etched GaAs/AlGaAs waveguides.

Micro-ring glass resonators have also been demonstrated in the form of an air-clad glass micro-ring vertically coupled to buried channel waveguides [3]. An integrated optic ring resonator has also been fabricated with two stacked layers of silica waveguides on silicon [4]. In both references [3] and [4], buried waveguide channels serve as input/output waveguides, allowing both low fibre-coupling losses and a controlled mode-coupling in the directional-coupler region. However, these methods require two steps of both deposition and etch of the waveguide core, and the alignment of the second waveguide core to the first one is very critical.

Apart from ring resonators, there are many other devices that need low index contrast, but would benefit from the possibility of having low-loss, tightly bending waveguide sections. As an example, it is well known that for filter design, the higher the order, the better shaped is the transfer function [5]. But the higher the order of the filter the longer the device. However, there is always a limited wafer size in an integrated optic process, which may limit the number of stages of the filter. As a concrete example, a 1-from-4 add/drop filter realised by a cascade of Mach-Zehnder interferometers with ⅝ stages (and SiON technology) requires a chip with dimensions of 75×5.6 mm [6]. This clearly requires a large wafer size. The design constraint of wafer size could be removed if the (linear) device could be divided into sub-sections, each sub-section being connected by a low-loss bent waveguide. But this is not generally possible, since a device component such as a Mach-Zehnder interferometer needs a low index contrast fabrication for good quality, which in turn precludes being able to provide low-loss bent waveguides with a small enough bend radius.

Still more generally, for any integration process, it is desirable to pack as many devices onto a single chip. In this respect, integration of planar optical devices is no different from other forms of integration [7]. For waveguide devices, high packing densities will be difficult to achieve without low-loss tight waveguide bends.

It would therefore be highly desirable in the fabrication of ring resonators, optical add/drop multiplexers and a variety of other optical devices, if high and low refractive index contrast waveguide sections could be conveniently combined on a single chip. The high refractive index contrast waveguide sections could then be used for low-loss tight bends, whereas the other device components could be realised in low refractive index contrast waveguide sections to optimise their quality.

SUMMARY OF THE INVENTION

According to the invention there is realised a waveguide structure comprising a combination of buried waveguide sections and ridge waveguide sections on the same substrate, sharing a common core layer. The buried waveguide sections thus provide the low index contrast desirable for couplers and other device components, whereas the ridge waveguide sections provide the high index contrast needed for efficient low-loss curved waveguides. The hybrid structure is fabricated starting from a low index contrast buried planar waveguide. Cladding material on at least one side of the waveguide core is then removed, e.g. by etching, to enhance the index contrast in that section of the waveguide. The other sections of the waveguide core remain buried and thus retain low index contrast.

Using this approach a variety of optical devices, such as add/drop multiplexers for WDM applications, can be made with large feature sizes of several microns using silica-on-glass or silica-on-silicon technology, for example. Specifically, there is no need to resort to nanofabrication technology using difficult or costly techniques such as electron beam lithography or inductive-coupled plasma ion etching.

The invention thus enables fabrication on a single chip of an optical device having a mixture of high and low index contrast waveguide sections, thus allowing independent optimisation of parts of the device which had irreconcilable design requirements in prior art fabrication methods.

Further, the invention allows low-loss bends, such as L-bends or U-bends to be made wherever desired on a chip by removing material to form an exposed ridge section, thereby allowing better use of the space available on a chip. Higher device packing densities are thus easily achievable in integrated waveguide devices. In one example described further below, ridge section U-bends are used to form a multiple cascade of Mach-Zehnder interferometers made out of buried waveguide sections.

A transition section is advantageously arranged between a buried and ridge waveguide section to provide very low transition losses. The transition section can be formed by tapering, preferably adiabatically, the lateral dimensions of the cladding layer beside the core of the waveguide so that the lateral cladding thickness increases from a low (possibly zero) value in the ridge section to a high (typically effectively infinite) value in the buried waveguide section. In this context, 'effectively' infinite is meant to describe that the lateral cladding thickness is sufficiently large that substantially no field of the fundamental waveguide mode extends beyond the lateral cladding. With this tapered transition section, coupling of the respective propagation modes in the buried and ridged waveguide sections is effected by mode adaptation in the transition section.

In embodiments of the invention, the waveguide is single mode, preferably both in the buried and ridge sections, although multimode behaviour may be of interest in some applications.

It is believed that this kind of transition based on modulation of the cladding thickness beside the core has not previously been contemplated. By contrast, prior art designs of such transitions rely instead on modulation of the thickness of the waveguide core itself, as described in references [8] and [9].

The invention may be embodied in waveguide structures operable over a wide range of wavelengths and using a wide range of waveguide fabrication technologies. Specifically, waveguide structures operable in the first, second or third telecommunications windows can be fabricated, e.g. a wavelength range of between 750 to 1650 nm can be accessed.

According to a first aspect of the invention, there is provided an optical device comprising a waveguide having a core extending in a plane between a buried section of the waveguide lying below an upper surface of the optical device and a ridge section of the waveguide having side surfaces extending below the upper surface beside the core, thereby to provide enhanced lateral confinement of waveguide modes in the ridge section.

In one embodiment, the ridge section of the waveguide comprises lateral cladding between the core and the side surfaces of the ridge section. The lateral cladding in the ridge section may have a width of between 0.1 and 1 microns.

In another embodiment, in the ridge section of the waveguide, the core extends laterally to the side surfaces of the ridge section.

A transition section may be provided interconnecting the buried and ridge sections, the transition section comprising lateral cladding having a width that increases from the ridge section to the buried section to increase the effective refractive index of the fundamental mode of the waveguide from a lower value in the ridge section to a higher value in the buried section. The cladding width may be varied adiabatically in the transition section, thereby to suppress transition losses.

The core may describe a bend in the ridge section of the waveguide. The waveguide may be single mode both in the buried section and the ridge section.

An upper cladding layer may be arranged between the upper surface and the core, or the buried section may lie directly below the upper surface According to a second aspect of the invention there is provided a method of fabricating a waveguide structure starting from a buried waveguide structure comprising a buried waveguide core lying below an upper surface, the method comprising removal of parts of the buried waveguide structure beside the core to form a ridge containing the core, thereby creating a hybrid buried/ridge waveguide structure having a continuous common core with enhanced lateral confinement of waveguide modes in the ridge.

The ridge may comprise a bend.

According to a third aspect of the invention there is provided an optical device comprising first and second cascades of Mach-Zehnder interferometers implemented in respective first and second buried waveguide structures and an interconnecting ridge waveguide structure sharing a common core with the first and second buried waveguide structures and describing at least one ridge waveguide bend.

The bend may be U-shaped to provide a half turn, with the first and second cascades being arranged side by side. The ridge waveguide bend may have a radius of between 200 microns and 5 cm, more especially of between 1 mm and 1 cm.

According to a fourth aspect of the invention there is provided an optical device comprising first and second linear waveguides and at least one ring waveguide arranged therebetween so as to form first and second couplers with the first and second linear waveguides at respective first and second tangential coupling regions comprising first and second coupling sections of the at least one ring waveguide and adjacent first and second coupling sections of the first and second linear waveguides, wherein the first and second coupling sections of the ring and linear waveguides are buried, whereas further sections of the at least one ring waveguide are ridges.

The further sections may have a bend radius at least five times larger than a bend radius of the coupling sections of the at least one ring waveguide.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
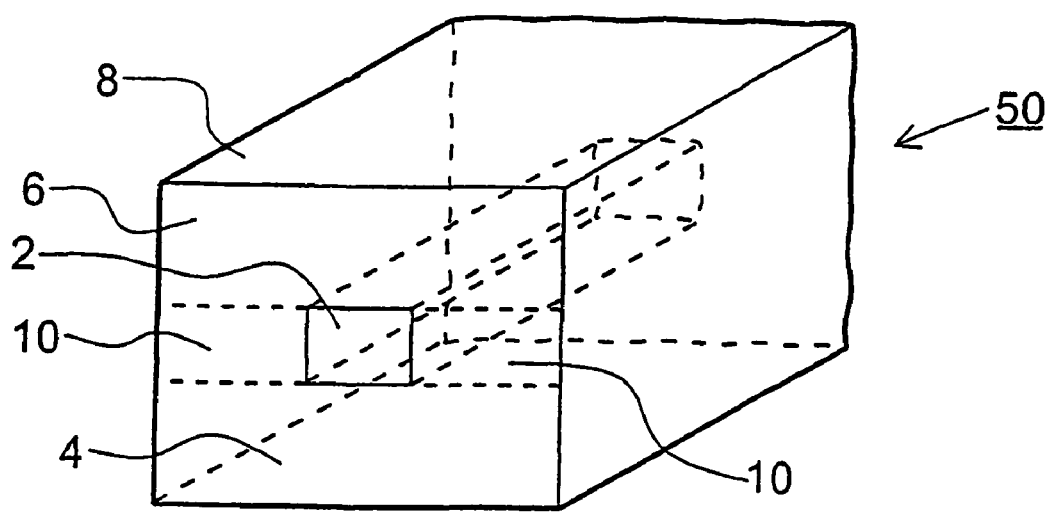
FIG. 1 is a schematic perspective view of a buried waveguide section of an optical device.
Figure 2:
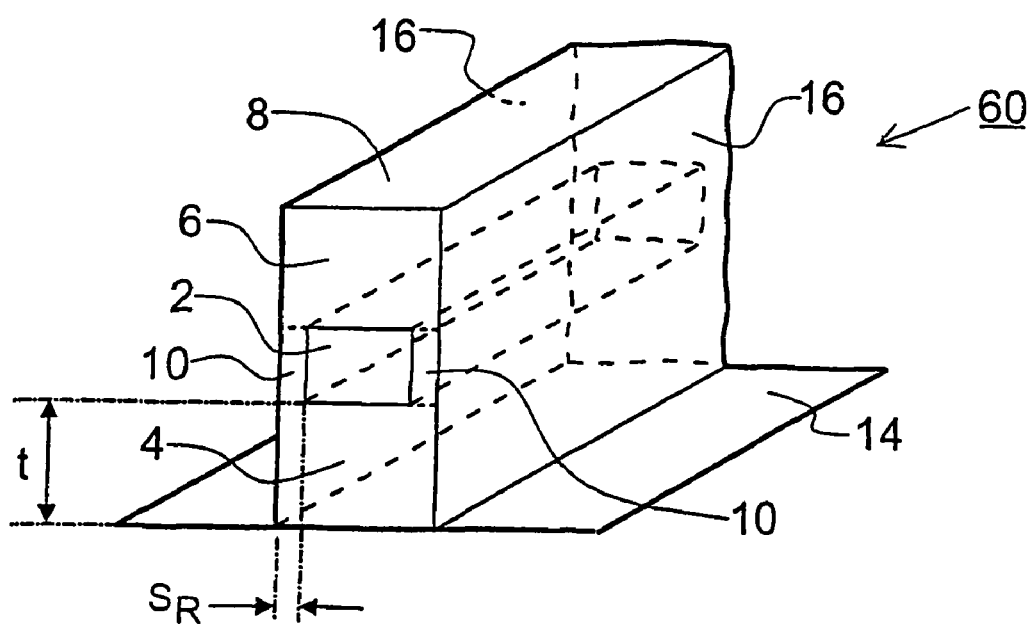
FIG. 2 is a schematic perspective view of a ridge waveguide section of an optical device.

FIG. 1 is a schematic perspective of a buried waveguide section 50 which forms component part of an optical device of a first embodiment of the invention. In this embodiment the example of a glass waveguide realised by silica on silicon fabrication is taken. The silica is doped with Ge to provide the desired level of refractive index contrast. Other dopants could be used in alternative embodiments. The buried waveguide section comprises a generally rectangular section core 2 extending in a plane beneath an upper surface 8 and surrounded by cladding material built up from an upper cladding layer 6, a lower cladding layer 4 and two lateral cladding layers 10 on either side of the core 2. The silica waveguide structure is arranged on a silicon substrate (not shown). In alternative embodiments, other substrates such as glass (doped or undoped) may be used. The main role of the substrate is to provide mechanical support. In this example of silica on silicon, the physical parameters are:

refractive index of the core layer (@ 1550 nm): 1.4697
refractive index of the cladding layers (@ 1550 nm): 1.4552
core width: 4.5 $\mu$m
core thickness: 5 $\mu$m
lateral cladding thickness=core thickness: 5 $\mu$m
lateral cladding width ($s_B$): 9 $\mu$m
upper cladding layer thickness: 6 $\mu$m FIG. 2 is a schematic perspective of a ridge waveguide section 60 which forms a second component part of an optical device of the first embodiment. The ridge waveguide section 60 is realised by fabricating or processing of a buried waveguide section as shown in FIG. 1. For example, the structure may be formed by the post-processing method of etching down from the upper surface 8 either side of the core 2 to form a ridge containing the core 2. The ridge waveguide section 60 thus has side surfaces 16 extending down from the upper surface 8 beside the core to provide enhanced lateral confinement of waveguide modes in the ridge. The etching is performed in this embodiment so that side surfaces 16 extend down past the core 2 to a lower surface 14 from which the ridge stands proud, with the core elevated above the level of the lower surface 14. More specifically, the etch is through not only the upper cladding layer 6 (6 micron thickness), and beside the core (5 micron thickness), but also extends further down into the lower cladding layer 4 by a further 9 microns (dimension 't' in the drawing). The side surfaces of the ridge thus have a total depth of 20 $\mu$m, 6 $\mu$m for the upper cladding, 5 $\mu$m for the core and 9 $\mu$m for the lower cladding (t).

In alternative embodiments the dimension 't' may be varied between zero and about 2 or 3 times the core thickness. Generally, as 't' is increased from zero bending losses will decrease until a saturation is reached when the light field no longer extends sufficiently to interact with the lower surface 14. The choice of 't' will also depend on the level of mode confinement, i.e. the refractive index contrast.

In further alternative embodiments the upper cladding layer 6 may be omitted or made very thin so that the upper surface 8 lies directly in contact with the core 2 or lies very close thereto. The required lateral confinement in the buried waveguide is still achievable. In this case, the buried waveguide may be termed a surface waveguide.

Although not illustrated, in the example structures, silica cladding extends below the lower surface 14, typically by a further 10 and 20 microns before the silicon substrate is reached. As a result, the silicon substrate has substantially no effect on the optical waveguiding of light confined by the core 2.

In this embodiment, the ridge is slightly wider than the core so that there is lateral cladding of width $s_R$ either between the core 2 and the two side surfaces 16 of the ridge. The lateral cladding width $s_R$ is chosen in the range between 0.1 and 1 microns for this structure. Provision of lateral cladding is beneficial since any roughness or width fluctuations in the etched side surfaces do not have such a major effect on the propagation efficiency of modes in the waveguide. If the lateral cladding width is zero, i.e. the etch passes through the sides of the core, care needs to be taken that the etch process provides highly smooth and straight side surfaces.

Figure 3:
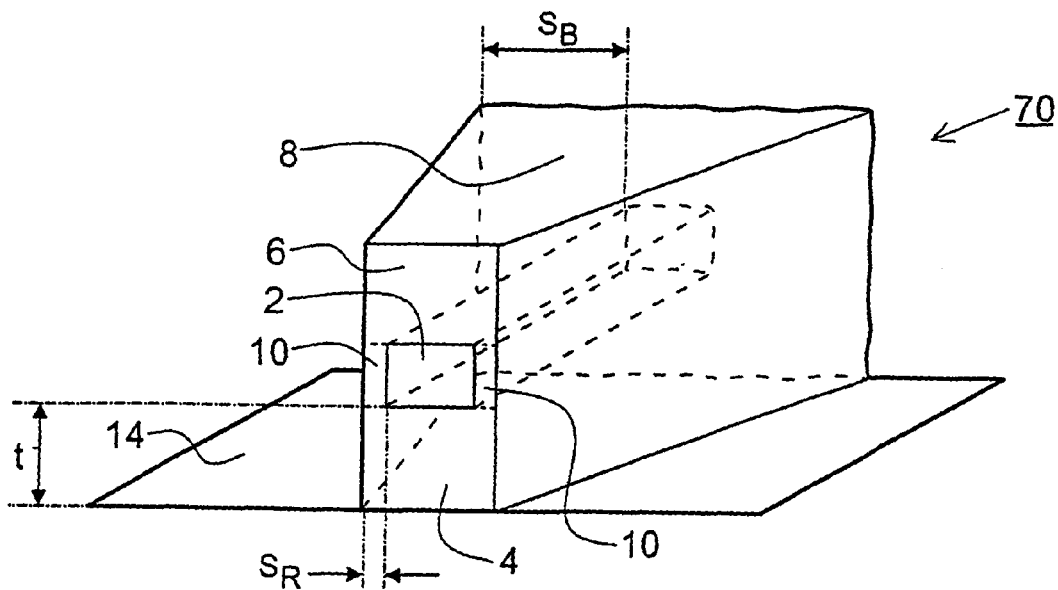
FIG. 3 is a schematic perspective view of a transition waveguide section of an optical device.
Figure 4:
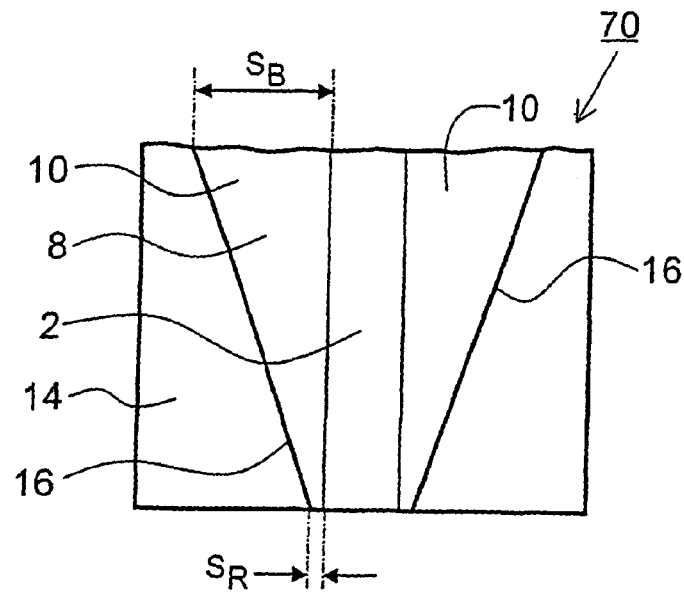
FIG. 4 is a schematic plan view of the transition waveguide section of FIG. 3.

FIGS. 3 and 4 are respectively schematic perspective and plan views of a transition waveguide section 70 which forms a third component part of an optical device of the first embodiment. The transition waveguide section 70 is used to link buried and ridge waveguide sections 50 and 60. In the transition waveguide section 70, lateral cladding is provided that widens gradually (i.e. tapers out) from the ridge section value $s_R$ to the buried waveguide section value $s_B$. A linear taper is shown in the figure. This has the effect of increasing the effective refractive index of the fundamental mode of the waveguide from a lower value in the ridge section to a higher value in the buried section, as will be described in more detail shortly. The taper in the transition waveguide section is preferably adiabatic to suppress transition losses. The length of the taper is chosen according to the losses that can be tolerated. A more rapid taper gives higher losses, but also provides a shorter length of the transition waveguide section. This design trade-off can be made using standard beam propagation method (BPM) simulations. In the present example, the transition waveguide length, i.e. taper length, is chosen to be 100 microns.

Figure 5:
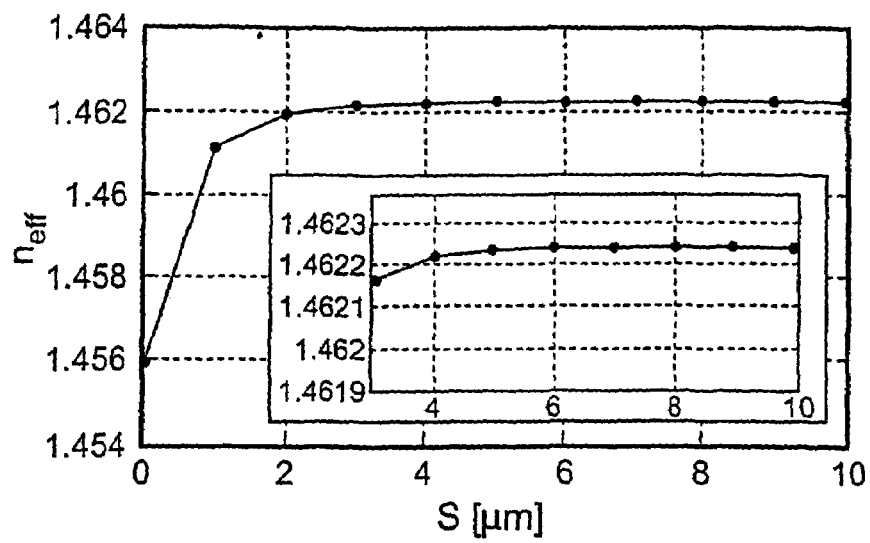
FIG. 5 is a graph showing the variation of effective refractive index of the fundamental mode with lateral cladding width in an example.

FIG. 5 is a graph showing the variation of effective refractive index $n_{eff}$ of the fundamental mode of a silica waveguide, such as those of FIG. 1 or 2, as a function of the lateral cladding width s, where $s=s_B$ for buried waveguide section and $s=s_R$ for ridge waveguide section. It is evident that the effective refractive index saturates above a certain cladding width, which is about 6 microns in this example. Moreover, for a significant effective refractive index reduction from the saturated value, it is evident that the cladding width needs to be reduced to well below the saturation value, in this example below about 1 micron.

In the present embodiment, both the buried and ridge waveguide sections are single mode. As the effective refractive index $n_{eff}$ decreases when the lateral cladding is etched away, the waveguide dimensions are chosen so that the buried waveguide section is single mode, with the first odd mode slightly below the cut-off, and so that the ridge waveguide section has a mode that is sufficiently confined. Moreover, in this embodiment, the core dimensions are the same in both the buried and ridge waveguide sections and, therefore, the effective refractive index $n_{eff}$ of the ridge waveguide section is very low, near the cladding refractive index, as is apparent from FIG. 5. This is not a problem because the ridge waveguide section is used for making bends and the $n_{eff}$ increases when the waveguide is curved. Due to the increased refractive index contrast, the field in the curved ridge waveguide section is well confined and the waveguide remains single mode.

In the present embodiment, the cladding width $s_B$ for buried waveguide section is chosen to be above about 6 microns, i.e. a width sufficiently large to ensure that the modal field is not significantly influenced by the air or other filling material that lies outside the cladding. In the specific example, a value of $s_B=9$ μm is chosen. For the ridge waveguide section, the cladding width $s_R$ is chosen to be below about 1 micron, i.e. a width small enough to ensure that the modal field has significantly overlap with the air or other low index filling material outside the cladding. As discussed above, the requirements imposed on the etching process are less stringent if the cladding width $s_R$ is not zero, preferably at least 0.1 microns with these materials.

Figure 6:
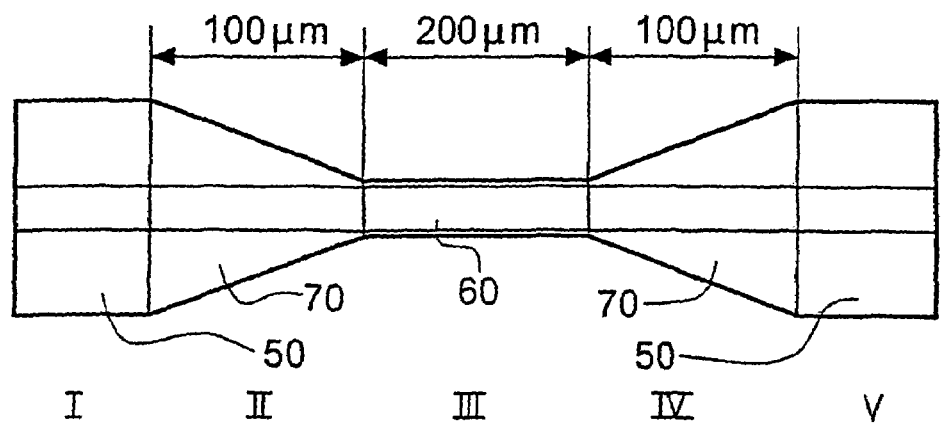
FIG. 6 is a plan view of a hybrid waveguide structure having a ridge waveguide section, as shown in FIG. 2, interconnecting two buried waveguide sections, as shown in FIG. 1, via respective transition waveguide sections, as shown in FIGS. 3 and 4.

FIG. 6 is a plan view of a hybrid waveguide structure bringing together each of the components discussed above. Namely, a ridge waveguide section III, as shown in FIG. 2, is arranged interconnecting two buried waveguide sections I and V, as shown in FIG. 1, via respective transition waveguide sections II and IV, as shown in FIGS. 3 and 4. A hybrid buried/ridge waveguide structure is thus created having a continuous common core that extends in a plane, in some sections buried and in other sections emerging from the buried sections to run along elevated, ridge sections. As will be appreciated from the above discussion of FIG. 5, a mode travelling in the waveguide thus experiences variations in refractive index contrast along its path, with higher refractive index contrast in the exposed ridge sections and lower refractive index contrast in the submerged, buried sections. Couplers and other device features can thus be fabricated in buried sections, whereas, whenever a tight bend is required, the surface can be etched away to form a ridge section of high index contrast.

In the specific example, the variation in refractive index contrast is such that, whereas the minimum bend radius in the buried waveguide sections is 5 mm, it is only a few 100 microns in the ridge waveguide sections (depending on the cladding width $s_R$). A quite remarkable effect is thus achieved with this simple post-processing of a buried planar waveguide. Concrete examples of optical device structures incorporating such a combination of (buried) couplers and (ridge) bends are described further below.

Simulations carried out with the BPM method predict a total loss of only 0.012 dB from sections I to V of the structure shown in FIG. 6. This very low loss is attributable to modal mismatch between the different sections of the structure.

Having now described the basic components of buried and ridge waveguide sections, as well as the interconnecting transitions, some device examples incorporating these components are now described.

Figure 7:
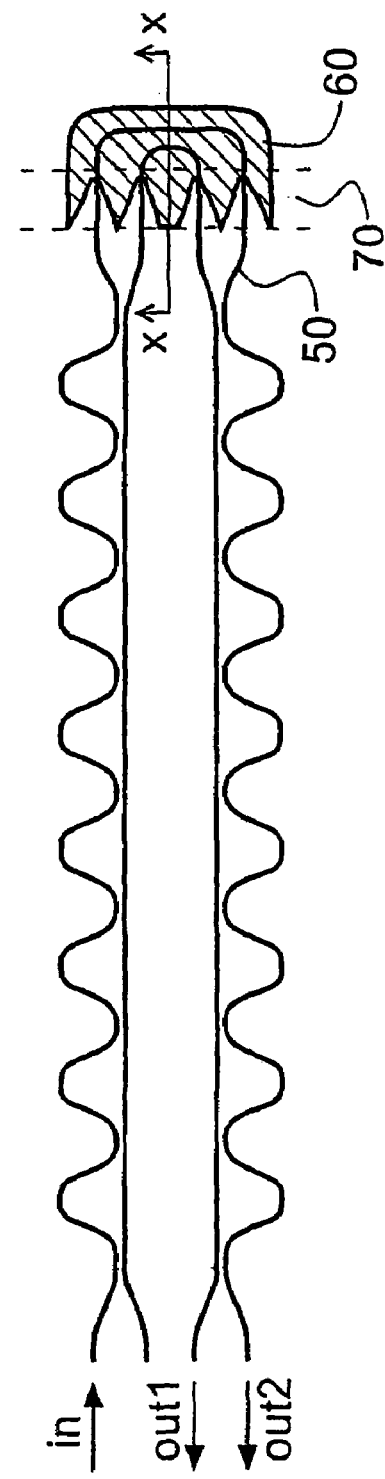
FIG. 7 is a schematic plan view of an add/drop filter according to an embodiment of the invention comprising first and second cascades of Mach-Zehnder interferometers, realised with buried waveguide sections, interconnected by U-bend ridge waveguide sections.

FIG. 7 is a schematic plan view of a filter, such as is useful for WDM systems, according to an embodiment of the invention. In the prior art [5], an add/drop filter based on a cascade of Mach-Zehnder (MZ) interferometers is a known device which has a long length and thus requires a large chip. Utilising the hybrid buried/ridge waveguide structure described above, this conventional device can be made shorter, as illustrated. In the figure, the thick black lines indicate waveguide cores. The MZ cascade structure is evident, each half of the device comprising a first, straight waveguide core and a second, undulating waveguide core that repeatedly tangentially couples with the straight waveguide. The top surface of the chip is shown white and the lower surface is shown with hatching. The shortening of the device in the present embodiment is achieved by sub-dividing the MZ cascade into first and second cascades arranged in parallel side-by-side and each being realised with buried waveguide sections 50. The device has in input/output end (left side in the drawing) and a folded end (right side of the drawing) in which the first cascade is joined to the second cascade. At this folded end, the surface layer is etched away to elevate the core in ridge sections 60, as previously described. Appropriate linear transitions sections 70 are formed between the buried and ridge sections. The two adjacent MZ cores of the different MZ cascades are linked by a first U-shaped ridge section and the two remote MZ cores are interconnected by a further U-bend ridge waveguide section. Taking the specific examples of silica waveguides discussed further above, bends with radii of curvature down to about 100 microns can be made without significant bending losses.

Figure 8:
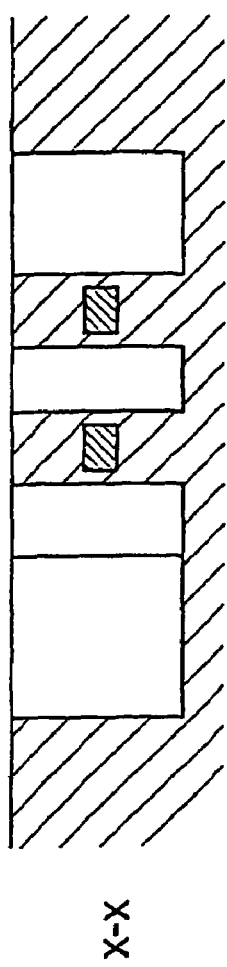
FIG. 8 is a section through X—X of FIG. 7.

FIG. 8 is a cross-section through the folded end of the device, as indicated by the section line X—X in FIG. 7. As shown, the etching of the top layer has formed a number of trenches leaving the waveguide cores elevated in ridge sections. The etching leaves a track either side of the core, which are shown being slightly laterally offset from the core, but could cut through the core ($s_R=0$). The width of the tracks should be sufficiently large to provide enough space for evanescent field decay of the waveguide modes in the air. In addition, for devices such as shown in FIG. 8 where two or more ridges run alongside, the track widths need to be large enough to avoid undesired coupling between modes of adjacent ridge waveguides. With glass on silicon technology, the track widths should preferably be greater than about one micron. For semiconductors, track widths can be reduced to about 0.1 microns. There is of course no upper limit to the track width. If convenient, e.g. at a chip edge, the ridges can be free standing so that there is effectively no track, at least on one side of such a ridge.

Furthermore, it will be understood that the trenches need not necessarily be left open, i.e. filled with air or some other passivating gas, but could be overgrown with a material of lower refractive index than the cladding material. Overgrowth will generally not be performed for silica technology owing to the lack of a suitable material with sufficiently low refractive index to provide a desired level of index contrast. On the other hand, for semiconductor technology the waveguide core and cladding materials have much larger refractive indices so that overgrowth with a variety of materials is possible while retaining a desired level of index contrast.

Folding the MZ cascade in this way into two, or if desired three or more, separate cascades of shorter length is of course advantageous, since a smaller chip can be used. In addition, making the chip shorter helps reduce any problems arising from long-range fluctuations of the material parameters across the chip, e.g. a gradual change in the refractive index across the chip. Although the same effect can be achieved by an optical fibre loop pigtailed to the chip edge, instead of the curved ridge waveguide solution adopted, a fibre loop solution is technically inferior in a number of respects. First, the inherent coupling losses into and out of the fibre would be much higher. Second, the actual coupling losses may be still higher since the alignment for pigtailing is likely to be imperfect. In any case, pigtailing is a relatively onerous procedure in comparison to the etch solution of the present embodiment. Third, optical fibres have a minus bend radius of about 5 cm, so that a considerable amount of space is taken up beside the chip. The small radii on-chip ridge waveguide sections of the present embodiment offer a far superior technical solution.

Figure 9:
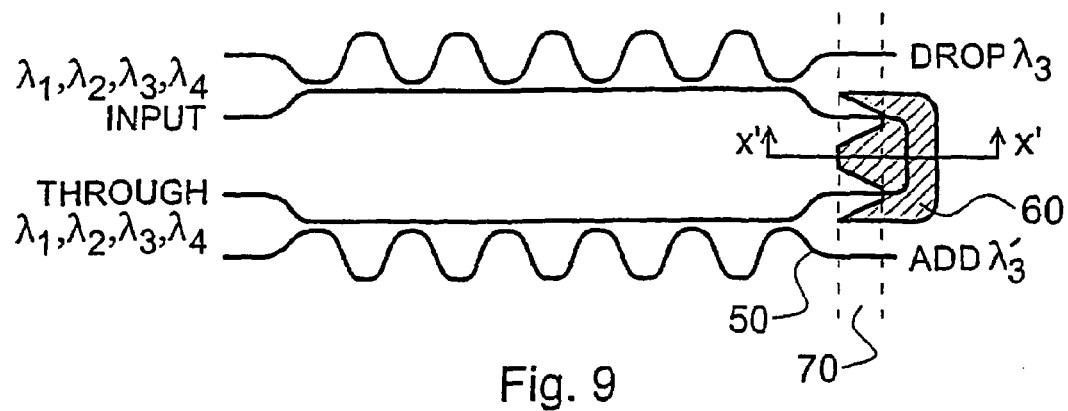
FIG. 9 is a schematic plan view of an add-after-drop filter according to an embodiment of the invention comprising first and second cascades of Mach-Zehnder interferometers, realised with buried waveguide sections, interconnected by a U-bend ridge waveguide section.

FIG. 9 is a schematic plan view of an add-after-drop filter according to another embodiment of the invention, the features of which will be generally understood from the above description of the previous embodiment. In the prior art [5a], an add-after-drop filter based on a cascade of Mach-Zehnder (MZ) interferometers is a known device which has a long length and thus requires a large chip. Utilising the hybrid buried/ridge waveguide structure described above, this conventional device can be made shorter, as illustrated. The only structural difference of this embodiment in comparison to the previous embodiment is that the outside buried channels of the two MZ cascades are not wrapped around by a ridge section, but rather fed to the chip edge as DROP and ADD lines. The buried inner channels 50 of the two MZ cascades are wrapped around by a ridge section 60 as shown in FIG. 2, as in the previous embodiment. Appropriate linear transition sections 70, as shown in FIGS. 3 and 4, connect the buried sections to the ridge sections. The device has four ports (INPUT, DROP, ADD, THROUGH). The upper MZ cascade forms the drop part of the device and the lower MZ cascade forms the add part.

Figure 10:
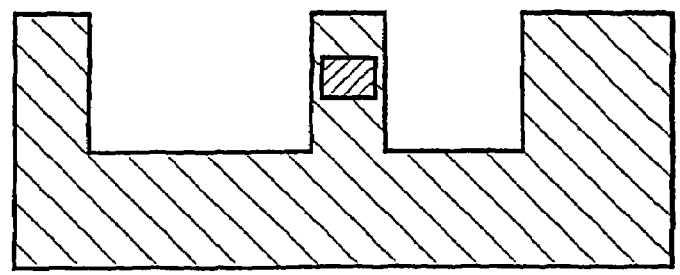
FIG. 10 is a section through X'—X' of FIG. 9.

FIG. 10 is a cross-section through the folded end of the device, as indicated by the section line X'—X' in FIG. 9 and shows the single ridge waveguide of the U-bend interconnecting the two inner buried channels of the MZ cascades.

The general comments made above in relation to the embodiment of FIG. 7 apply to the FIG. 9 embodiment, but are not repeated for the sake of brevity.

Figure 11:
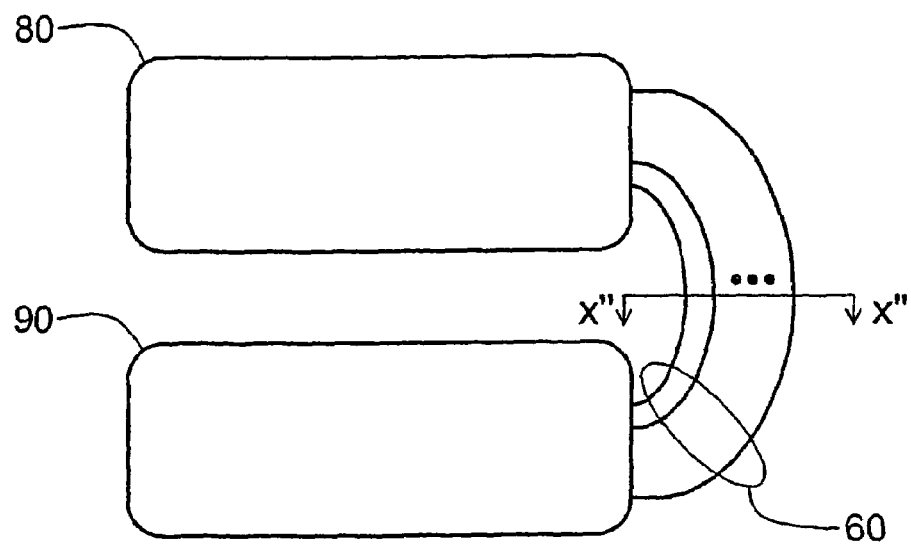
FIG. 11 is a schematic plan view representative of further embodiments of the invention comprising first and second integrated optical circuits interconnected by U-bend ridge waveguide sections.

FIG. 11 is a schematic drawing representing a generalised structure of first and second integrated optical circuits 80 and 90 realised in buried planar waveguide technology interconnected by a plurality of elevated ridge sections 50 (three in the figure) of the kind previously described. The purpose of this figure is to emphasise that the present invention may be applied to an arbitrary optical circuit and is in no way limited to the MZ device examples described above. Two or more arbitrary optical circuits may be thus joined together on the same chip with low-loss tight bends, thus avoiding the need for optical fibre or free space connections, or excessively long chips. It will also be appreciated that the optical circuits 80 and 90 may be a mixture of buried waveguide sections, non-buried waveguide sections and other optical elements, and need not be purely composed of buried waveguide sections.

Figure 12:
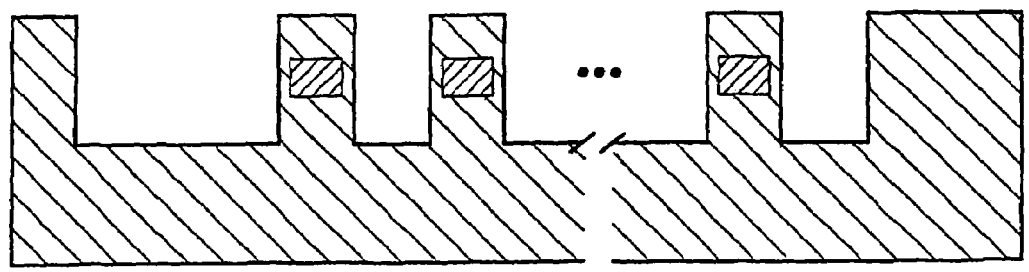
FIG. 12 is a section through X"—X" of FIG. 11.

FIG. 12 is a cross-section through the end of the device, as indicated by the section line X"—X" in FIG. 11 and shows the three ridge waveguides of the interconnect between the two arbitrary optical circuits 80 and 90.

Figure 13:
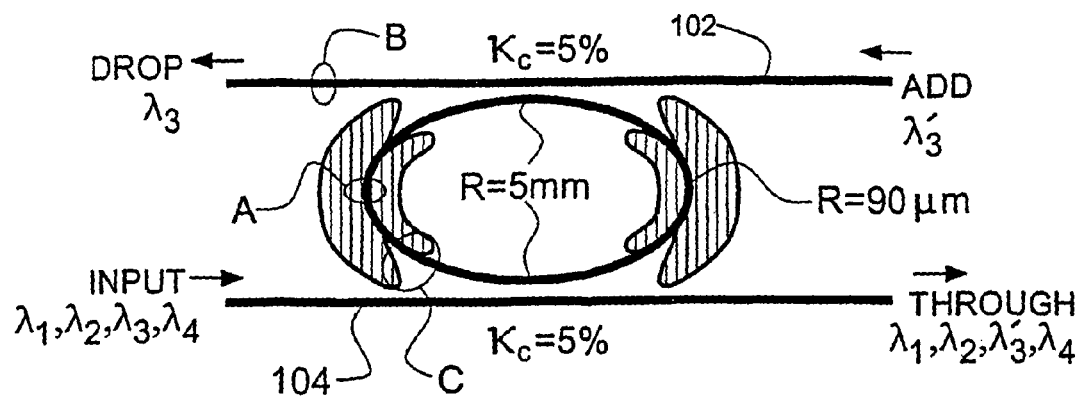
FIG. 13 is a schematic plan view of a ring resonator according to an embodiment of the invention.

FIG. 13 shows an add/drop filter such as is useful for WDM systems according to another embodiment. In this embodiment, the add/drop filter is in the form of a ring resonator. The specific parameter values given in these figures are example values for glass on silicon technology. The figure shows schematically the general form of the ring resonator device in plan view. The general form will be familiar from the prior art [2][3][4]. Namely, the device comprises a waveguide ring 100 arranged to lie within first and second input/output waveguide rails 102 and 104, the ring 100 having first and second circumferential portions that are approached tangentially by the first and second waveguide rails respectively to form two couplers both of the same coupling strength $k_c$ which is 5% in the example given.

The arrangement functions as an add/drop filter as indicated in the drawing with the example of a 4-channel WDM input signal INPUT having wavelength channels $\lambda_1$, $\lambda_2$, $\lambda_3$, $\lambda_4$ input to the left end (as viewed in the figure) of the lower rail 104 which has one channel $\lambda_3$ dropped by the resonator ring to output as an output signal DROP from the left end of the upper rail 102, while the other three channels $\lambda_1$, $\lambda_2$, $\lambda_4$ continue along the lower rail 104 to be output from the right end thereof as an output signal THROUGH. A channel $\lambda_3$' may be added by input into the upper rail 102 from the right side of the figure to output with the THROUGH signal.

The device incorporates the teachings of the invention through its hybrid buried/ridge waveguide structure. This is illustrated schematically in the figure through the hatched regions, which indicate an etched surface level of the chip. Away from the couplers, the ring 100 has a tight bend radius, R=90 microns in the specific example, and is made of a ridge structure, similar to that shown in FIG. 2, but curved (see labelled section "A" in FIG. 13). As the couplers are approached, the ridge structure tapers out from both sides of the ring through widening of the lateral cladding, similar to what is shown in FIGS. 3 and 4, but curved (see labelled section "C" in FIG. 13). In other words, two opposed transition regions of the kind described further above with reference to FIGS. 3 and 4 are formed. The lateral cladding tapers out so that at or slightly before the coupling point the waveguide is effectively a buried waveguide structure, as illustrated in FIG. 1 (see labelled section "B" in FIG. 13). The buried coupling sections have a length $L_{acc}$. As will be understood from the discussion of FIGS. 1 to 6 above, the coupling sections are buried in the sense that the lateral cladding is made sufficiently wide around the coupling point to ensure that the waveguide modes have substantially fully decayed within the lateral cladding.

In the transition region and subsequent buried-waveguide coupling region, the bend radius of the ring is gradually increased to reach a value of R=5 mm at the coupling point (which is over 50 times greater than the bend radius in the ridge section). Exemplary refractive index values for the core and cladding materials are 1.4967 and 1.4552 respectively, in the case of silica materials. The free spectral range (FSR) of the example ring is 100 GHz. The device can be used as an add/drop filter in a 25 GHz spaced dense WDM (DWDM) system. Alternatively, the device could also be used as an interleave, i.e. a device that separates odd from even channels in a WDM system, in a 50 GHz spaced DWDM system, or to remove noise components accumulated between channels in a 100 GHz spaced WDM system.

The hybrid ridge/buried waveguide design thus allows a ring resonator operable for WDM at 1.3 or 1.55 microns to be made with large-feature-size glass-on-silicon technology. (In the prior art, a device with similar operational specification would required use of small-feature size technology, such as GaAs). The coupling regions are formed by large radius bends in buried waveguides, whereas the ring can be made small enough to provide a free spectral range (FSR) large enough to satisfy the wavelength specifications of WDM by having a small bend radius, which is one to two orders of magnitude smaller than the bend radius at the coupler. This is made possible by the device's post-etched ridge structure in which the waveguiding core extends uninterruptedly and in the same plane through both ridge and buried parts of the ring. The prior art alternative solution [2] to the present approach is to use a strongly confined ridge waveguide throughout the device, in which case the dimensions of the waveguides become smaller and the couplers are more difficult to fabricate. For example, in reference [2], the waveguide has width 0.5 microns and thickness 0.45 microns. By contrast, in a specific example of the present embodiment, the corresponding waveguide dimensions are width 4.5 microns and thickness 5 microns. With this order of magnitude increase in dimensions, propagation losses arising from any roughness in the etched surfaces are not problematic.

Figure 14:
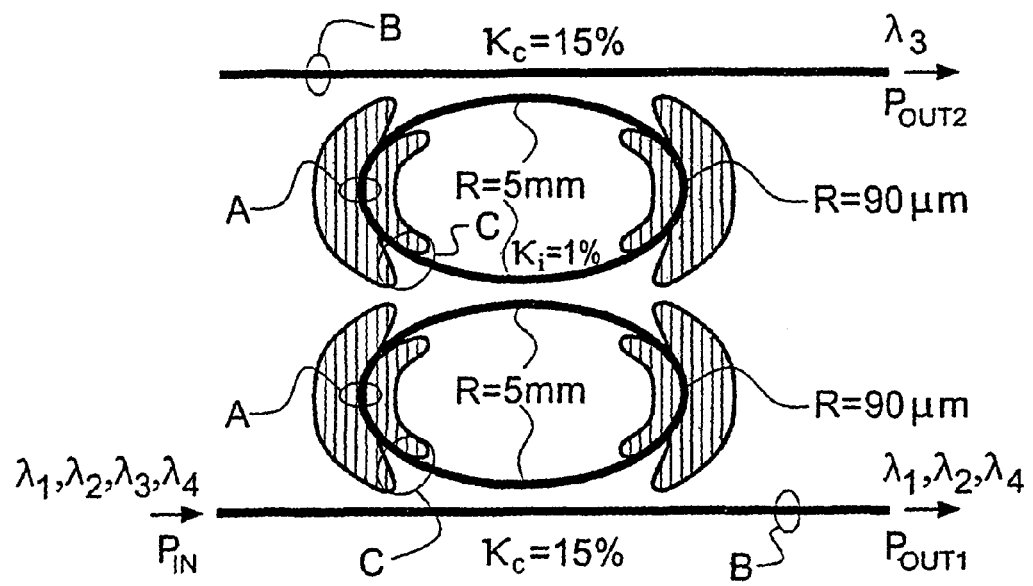
FIG. 14 is a schematic plan view of a multiple ring resonator according to another embodiment of the invention.

FIG. 14 shows another ring-based add/drop filter for WDM applications according to a further embodiment. With reference to FIG. 13, it will be understood that the device of FIG. 14 is a two-ring version of the device of FIG. 13. It is noted that the additional coupler between the rings is made without transition regions and burying, since its coupling coefficient can be made very small (1% is the example value indicated in the figure). The other couplers to the input/output waveguide rails are as in the FIG. 13 device, with transition regions leading to fully buried coupling sections of length $L_{acc}$. The example values for the coupling coefficients of these couplers is 15%. The labelling "A", "B" and "C" in FIG. 14 corresponds to that of FIG. 13. It will be appreciated that more than two rings could also be used in further embodiments with a suitable choice of coupling coefficients etc, for example to provide particular filter shapes. The free spectral range (FSR) of the example rings is 100 GHz. The device can be used as an add/drop filter in a 25 GHz spaced dense WDM (DWDM) system. Alternatively, the device could also be used as an interleave, i.e. a device that separates odd from even channels in a WDM system, in a 50 GHz spaced DWDM system, or to remove noise components accumulated between channels in a 100 GHz spaced WDM system.

Figure 15A:
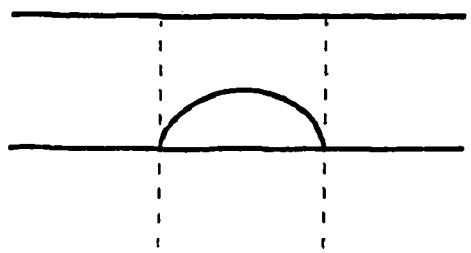
FIGS. 15A, 15B, 15C and 15D show schematic sections of three further types of buried waveguide structures in which the invention may be embodied.
Figure 15B:
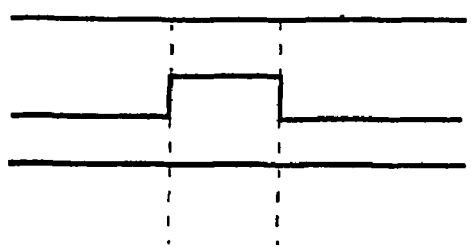
Figure 15C:
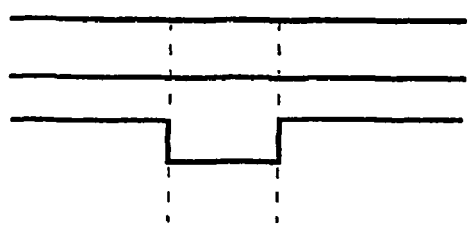
Figure 15D:
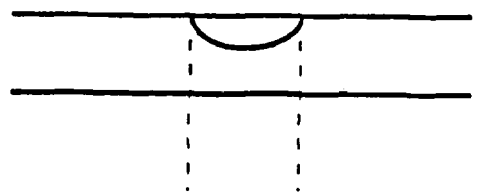

FIGS. 15A, 15B, 15C and 15D show schematic sections of four further types of buried waveguide shapes in which the invention may be embodied, in addition to the rectangular buried waveguide shown in FIG. 1. FIG. 15A shows a shape of a nominally rectangular buried waveguide in which the annealing process has transformed the rectangular shape into a smooth domed shape. This is not uncommon hwith some types of processing. FIG. 15B shows a buried waveguide structure usually referred to as a rib waveguide in the art FIG. 15C shows another buried waveguide structure which is usually referred to in the art as an inverse rib waveguide. Both the rib and inverse rib structures are buried below an upper cladding layer. FIG. 15D shows a buried waveguide structure with no cladding layer, the core lying directly below the upper surface of the waveguide structure. This structure may be termed as a surface waveguide structure. Alternatively, a thin cladding layer may be included having a thickness less than the waveguide mode penetration depth (not shown). A cladding layer can be omitted, since lateral confinement is sufficient to provide the desired effects, as will be understood from the above. Further waveguide shapes may be envisaged.

Although the invention has been described with reference to two main kinds of device, namely MZ cascades and ring resonators, it will be understood that the basic sub-components explained with reference to FIGS. 1 to 4 can be used to make any number of optical waveguide devices having a hybrid buried/waveguide structure. Moreover, it will be appreciated that tapered transition sections, although beneficial, could be dispensed with for devices that do not require minimisation of losses. If provided, the geometrical profile of the transition between ridge and buried sections can be chosen quite freely, but whatever profile is used it should be such that the modal field of the first waveguide is adiabatically adapted to that of the second waveguide if losses are to be minimised.

Further, although the above examples give parameter values for silica (or other glass) on silicon technology, the hybrid buried/ridge waveguide concept explained herein can be applied to planar waveguide technology of any materials system. The basic idea of a transition between two waveguides having different lateral confinement of the optical modal field achieved by lateral interface or surface structuring in a common planar structure is applicable to any planar fabrication technique in which surface structuring is possible, whether it be by etching, self-organised growth, micro-machining or whatever (e.g. silicon-on-silicon, lithium niobate, III–V semiconductor etc.). The surface structuring may be by post-processing (e.g. etching, micro-machining) or in situ processing during waveguide deposition (e.g. self-organised growth). However it is achieved, the lateral surface or interface structuring serves to vary locally the optical properties of the waveguides in the direction transverse with respect to the propagation direction to allow a mixture of high and low refractive index contrast waveguides sections to be fabricated in a common core as part of a single integrated optical device.

Moreover, as already mentioned above, although the embodiments have been explained mainly in terms of an air-bounded structure, the ridge sections could also be covered with a solid state material of suitably low refractive index. This might have advantages for stabilising or passivating the device, or simply protecting the transition and ridge waveguide sections. If a filling material is used, there is the requirement that it has a suitable refractive index to provide a sufficiently high lateral index contrast in the ridge waveguide sections.

REFERENCES

[1] R. Adar et al.—Measurement of very low-loss silica on silicon waveguides with a ring resonator—Appl. Phys. Lett. 58(5), 4 Feb. 1991 pages 444–5

[2] D. Rafizadeh et al.—Waveguide-coupled AlGaAs/GaAs microcavity ring and disk resonators with high finesse and 21.6 nm free spectral range—Optics Letters Vol. 22 No. 16 Aug. 15, 1997 pages 1244–6

[3] B. E. Little et al.—Vertically coupled Glass Microring Resonator Channel Dropping Filters—IEEE Photonics Technology Letters Vol. 11 No. 2 February 1999 pages 215–7

[4] S. Suzuki et al.—Integrated-Optic Ring Resonators with Two Stacked Layers of Silica Waveguides on Si—IEEE Photonics Technology Letters Vol. 4 No. 11 November 1992 pages 1256–8

[5] B. J. Offrein et al.—Tunable Optical Add/Drop components in Silicon-Oxinitride Waveguide Structures—Proc. ECOC'98, 20–24 Sep. 1998, Madrid, Spain, pages 325–6

[5a] B. J. Offrein et al.—Wavelength tunable optical add-after-drop filter with flat passband for WDM networks—IEEE Photonics Technology Letters, vol. 11, no. 2, pages 239–241 (1999)

[6] R. German et al.—Silicon-Oxinitride Layers For Optical Waveguide Applications—195th Meeting of the Electrochemical Society on Silicon Nitride and Silicon Oxide Thin Insulating Films, Seattle, Wash., May 2–7, 1999

[7] Takashi—Recent Progress on Silica-based Thermooptic Switches for ADMs/XCs—Proc. LEOS 1999 pages 485–6

[8] U.S. Pat. No. 5,659,646 by Vinchant et al—Optical Waveguide Transition and Method for Forming It—Issued Aug. 19, 1997

[9] Spuhler et al.—A Very Short Planar Silica Spot-Size Converter Using a Nonperiodic Segmented Waveguide—IEEE Journal Lightwave Technology Vol. 16, No. 9, September 1998 pages 1680–5

[10] C. K. Madsen and J. H. Zhao "Optical filter design and analysis: a signal processing approach" John Wiley & Sons, page 241 (1999)

What is claimed is:

1. An optical device comprising a waveguide having a core extending in a plane between a buried section of the waveguide lying below an upper surface of the optical device and a ridge section of the waveguide having side surfaces extending below the upper surface beside the core, thereby to provide enhanced lateral confinement of waveguide modes in the ridge section, and further comprising a transition section interconnecting the buried and ridge sections, the transition section comprising lateral cladding having a width that increases from the ridge section to the buried section to increase the effective refractive index of the fundamental mode of the waveguide from a lower value in the ridge section to a higher value in the buried section.

2. An optical device according to claim 1, wherein the size of the core is constant throughout the buried section, the transition section, and the ridge section.

3. An optical device according to claim 2, wherein the ridge section of the waveguide comprises lateral cladding between the core and the side surfaces of the ridge section.

4. An optical device according to claim 3, wherein the lateral cladding in the ridge section has a width of between 0.1 and 1 microns.

5. An optical device according to claim 2, wherein, in the ridge section of the waveguide, the core extends laterally to the side surfaces of the ridge section.

6. An optical device according to claim 2, wherein the cladding width is varied adiabatically in the transition section, thereby to suppress transition losses.

7. An optical device according to claim 2, wherein the core describes a bend in the ridge section of the waveguide.

8. An optical device according to claim 2, wherein the waveguide is single mode both in the buried section and the ridge section.

9. An optical device according to claim 2, further comprising an upper cladding layer arranged between the upper surface and the core.

10. An optical device according to claim 2, wherein the buried section lies directly below the upper surface.

11. A method of fabricating a waveguide structure starting from a buried waveguide structure comprising a buried waveguide core lying below an upper surface, the method comprising removal of parts of the buried waveguide structure beside the core to form a ridge containing the core and a transition section interconnecting the buried and ridge sections, the transition section comprising lateral cladding having a width that increases from the ridge section to the buried section, thereby creating a hybrid buried/ridge waveguide structure having a continuous common core with enhanced lateral confinement of waveguide modes in the ridge.

12. A method according to claim 11, wherein the size of the common continuous core is constant through the buried section, the transition section, and the ridge section.

13. A method according to claim 12, wherein the ridge comprises a bend.

14. An optical device comprising first and second cascades of Mach-Zehnder interferometers implemented in respective first and second buried waveguide structures and an interconnecting ridge waveguide structure sharing a common core with the first and second buried waveguide structures and describing at least one ridge waveguide bend.

15. An optical device according to claim 14, wherein the bend is U-shaped to provide a half turn, with the first and second cascades being arranged side by side.

16. An optical device according to claim 14, wherein the ridge waveguide bend has a radius of between 200 microns and 5 cm.

17. An optical device according to claim 14, wherein the ridge waveguide bend has a radius of between 1 mm and 1 cm.

18. An optical device comprising first and second linear waveguides and at least one ring waveguide arranged therebetween so as to form first and second couplers with the first and second linear waveguides at respective first and second tangential coupling regions comprising first and second coupling sections of the at least one ring waveguide and adjacent first and second coupling sections of the first and second linear waveguides, wherein the first and second coupling sections of the ring and linear waveguides are buried, whereas further sections of the at least one ring waveguide are ridges.

19. An optical device according to claim 18, wherein the further sections have a bend radius at least five times larger than a bend radius of the coupling sections of the at least one ring waveguide.

* * * * *